US006776075B1

(12) United States Patent
Grafe et al.

(10) Patent No.: US 6,776,075 B1
(45) Date of Patent: Aug. 17, 2004

(54) HIGH-SPEED SHEAR FOR TRANSVERSE CUTTING OF A THIN ROLLED STRIP

(75) Inventors: Horst Grafe, Hilchenbach (DE); Volker Loth, Freudenberg (DE); Jürgen Merz, Krueztal (DE)

(73) Assignee: SMS Demag AG, Düsseldorf (DE)

( * ) Notice: Subject to any disclaimer, the term of this patent is extended or adjusted under 35 U.S.C. 154(b) by 96 days.

(21) Appl. No.: 09/710,391

(22) Filed: Nov. 9, 2000

(30) Foreign Application Priority Data

Nov. 10, 1999 (DE) .......................................... 199 53 906

(51) Int. Cl.[7] ................................................. B26D 1/12
(52) U.S. Cl. ........................... 83/304; 83/305; 83/344; 83/556; 83/698.11
(58) Field of Search .......................... 83/556, 304, 305, 83/698.11, 501, 502, 344, 563, 557, 558, 669, 670, 686

(56) References Cited

U.S. PATENT DOCUMENTS

| | | | | | |
|---|---|---|---|---|---|
| 2,180,202 | A | * | 11/1939 | Hallden | 83/311 |
| 3,037,396 | A | * | 6/1962 | Martin | 74/409 |
| 3,369,436 | A | * | 2/1968 | Louse | 83/324 |
| 3,405,580 | A | * | 10/1968 | Hallden | 83/305 |
| 3,469,477 | A | * | 9/1969 | Welch et al. | 83/556 |
| 3,570,348 | A | * | 3/1971 | Hallden | 83/305 |
| 3,863,537 | A | * | 2/1975 | Huelsman | 83/503 |
| 3,897,705 | A | * | 8/1975 | Filleau et al. | 83/341 |
| 4,004,479 | A | | 1/1977 | Bodnar | |
| 4,171,655 | A | * | 10/1979 | Voorhees | 83/344 |
| 4,402,240 | A | | 9/1983 | Moyer | |
| 4,470,331 | A | * | 9/1984 | Eiting et al. | 83/333 |
| 4,667,550 | A | * | 5/1987 | Eiting | 83/56 |
| 4,922,778 | A | * | 5/1990 | Nagai | 83/501 |
| 5,013,291 | A | * | 5/1991 | Granger | 493/357 |
| 5,048,387 | A | * | 9/1991 | Niitsuma et al. | 83/344 |
| 5,207,138 | A | | 5/1993 | Sato et al. | |
| 5,662,018 | A | * | 9/1997 | Klein | 83/343 |
| 5,692,986 | A | * | 12/1997 | Long et al. | 475/14 |
| 5,857,396 | A | * | 1/1999 | Strouse, Jr. | 83/502 |
| 6,370,998 | B1 | * | 4/2002 | Yokoro et al. | 83/698.11 |

FOREIGN PATENT DOCUMENTS

| | | |
|---|---|---|
| DE | 0475512 | 4/1929 |
| DE | 2654866 | 6/1977 |
| DE | 9809813 | 10/1979 |

OTHER PUBLICATIONS

Patent Abstract of Japan No. JP–05 123919, May 1993.

* cited by examiner

*Primary Examiner*—Kenneth E. Peterson
*Assistant Examiner*—Omar Flores Sánchez
(74) *Attorney, Agent, or Firm*—Sidley Austin Brown & Wood, LLP

(57) ABSTRACT

A high-speed shear for transversely cutting a rolled ship having a small thickness and including at least one blade provided on one of two oppositely located drums, and a controllable device for displacing the two drums between a cutting position, in which the strip is cut, and an open run-through position in which the strip can be freely advanced between the two drums, with the two drums being synchronized in their open cutting position by respective tooth elements provided on the two drums and engaging each other, and with the tooth elements being so formed that they insure synchronization in the open position of the drums when they engaged each other with, a large tooth backlash and engaged each other substantially backlash-free in the cutting position of the drums.

6 Claims, 5 Drawing Sheets

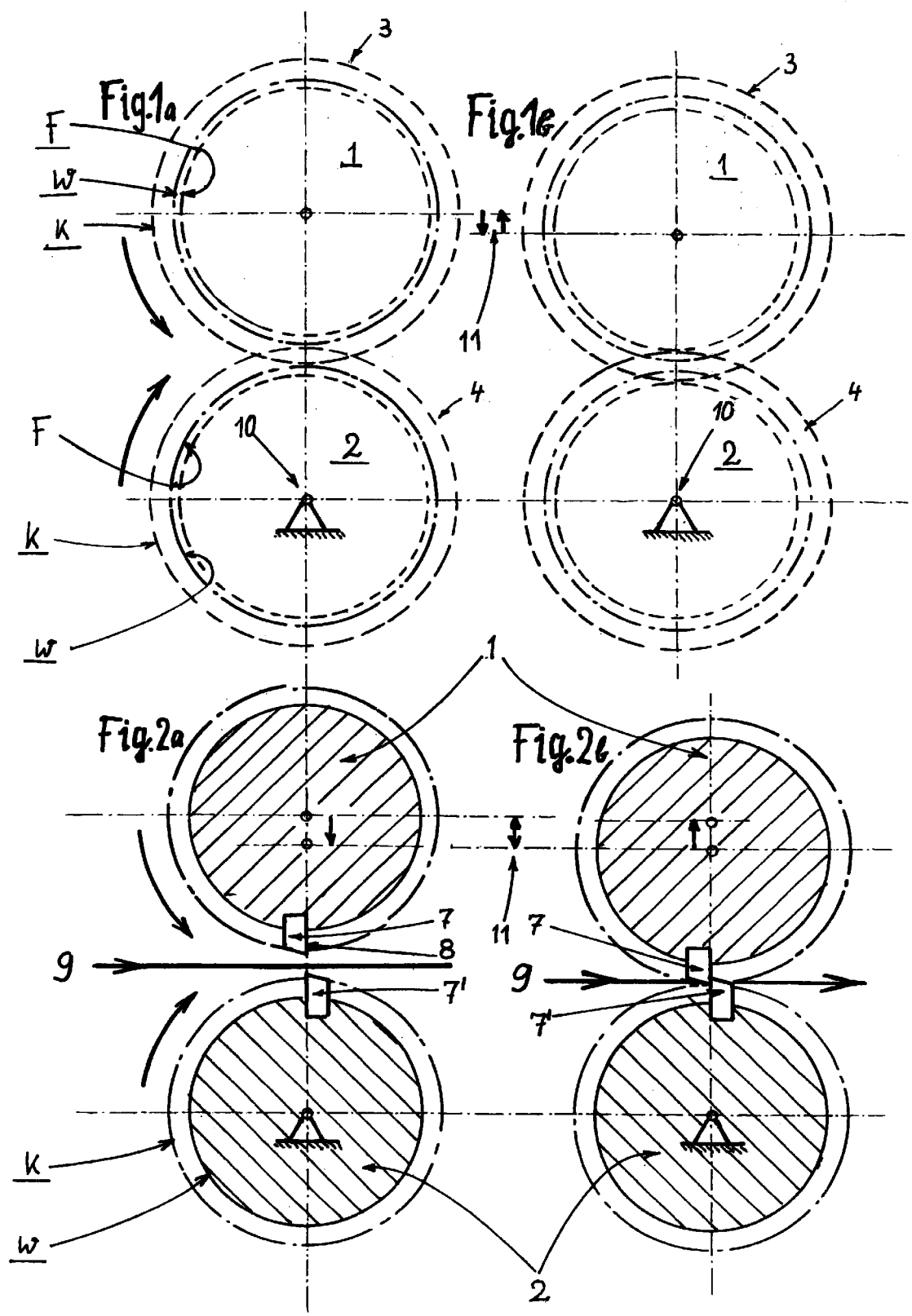

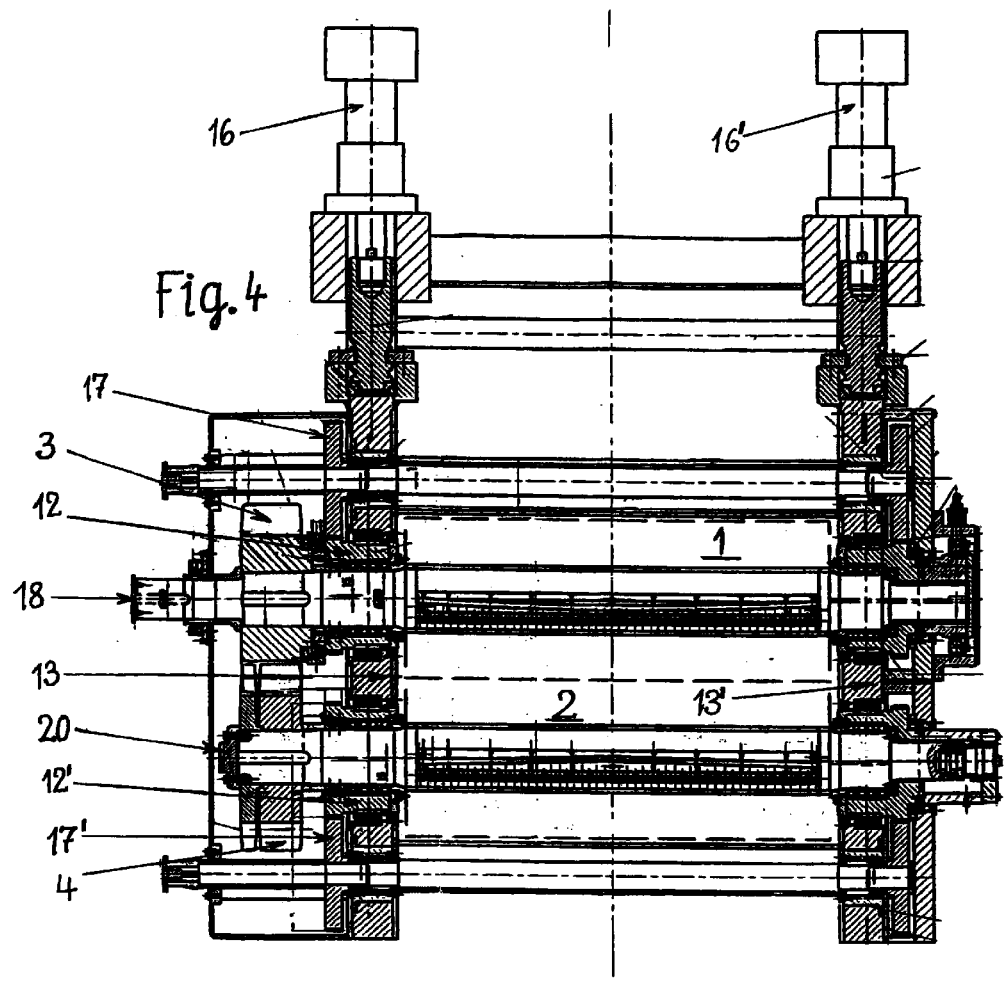
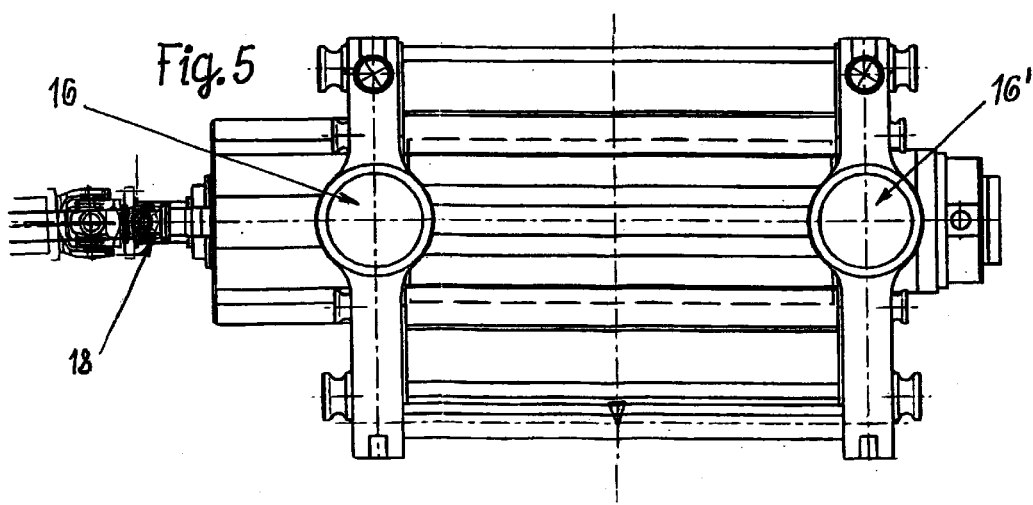

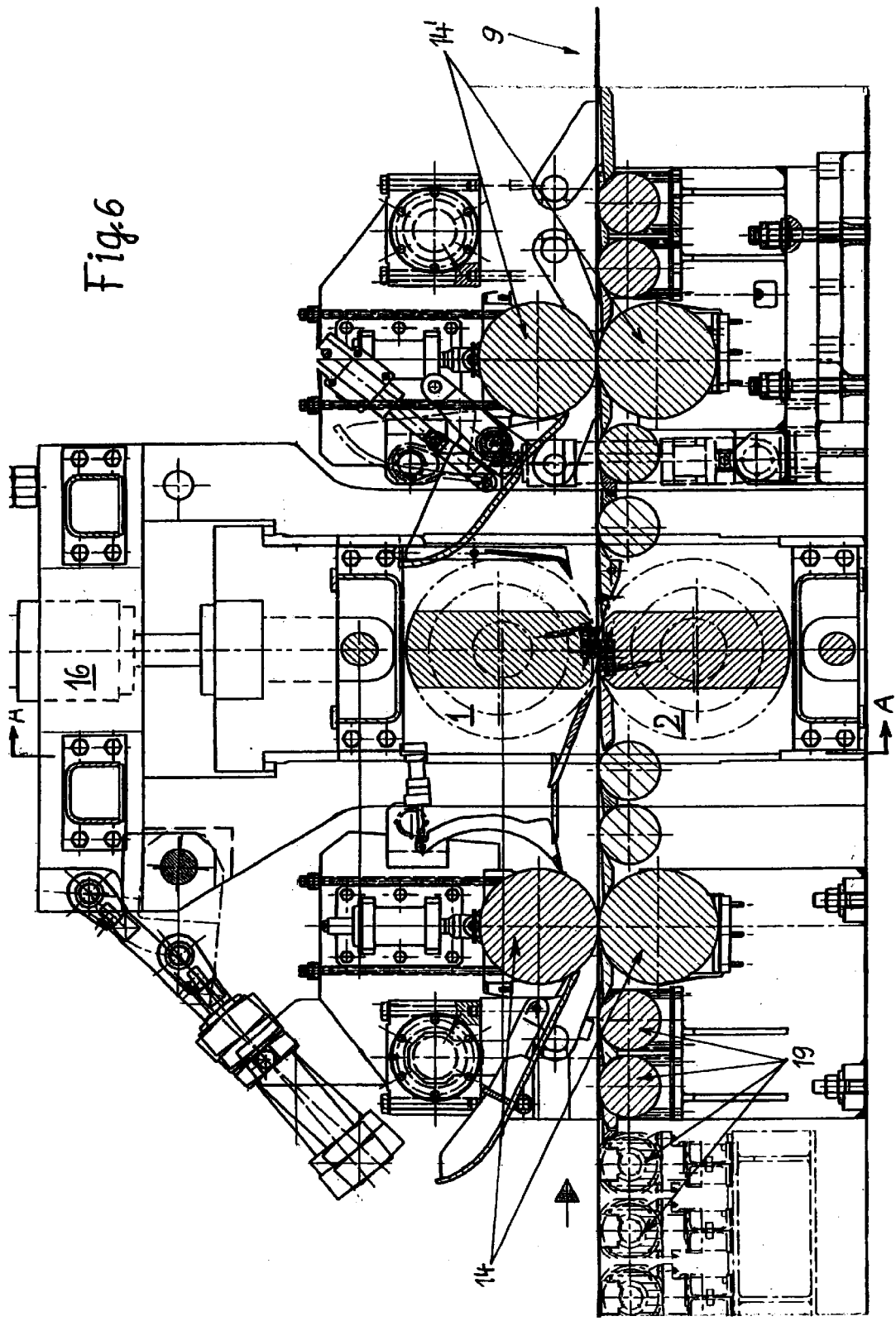

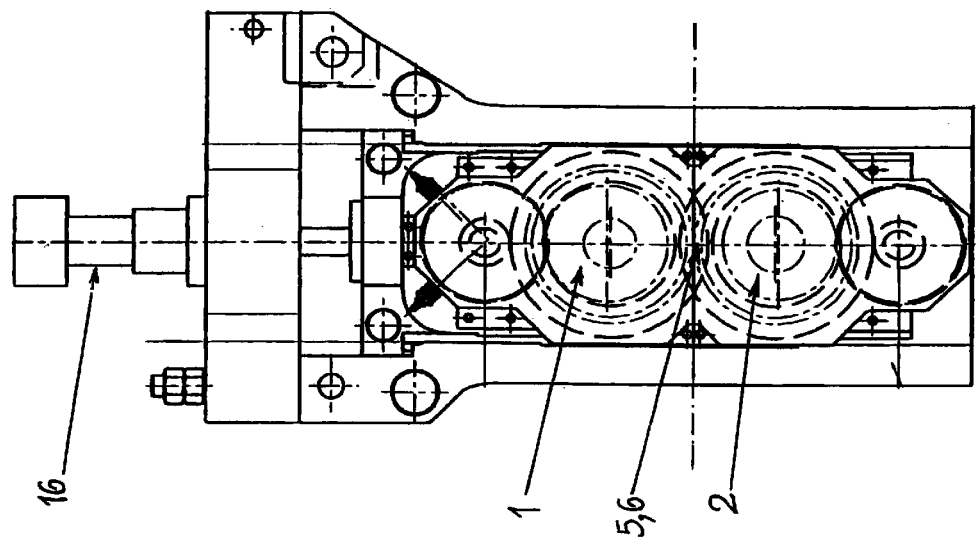

HIGH-SPEED SHEAR FOR TRANSVERSE CUTTING OF A THIN ROLLED STRIP

BACKGROUND OF THE INVENTION

1. Field of the Invention

The present invention relates to a high speed shear for transverse cutting of rolled strips, in particular, very thin strips, and including two, oppositely located drums, at least one blade having a cutting edge and provided on one of the two drums, with the blade being accelerated to the displacement speed of the to-be-cut strip, and a controllable device for displacing the two drums between a cutting position, in which the strip is cut, and an open rune-through position in which the strip can be freely advanced between the drums.

2. Description of the Prior Act

A shear of the type described above is disclosed, e.g., in German Patent No. 475,512. In the disclosed shear, the blades are connected with respective drums by levers and cooperate each with a cam disc, which is fixedly secured on a shaft of a respective drum, in such a manner that the blades do not circulate radially but are displaced parallel to each other and transverse to the rolled stock, with the rolled stock being cut, as with a stationary shear, usually across.

With such a drum shear, as with a drum shear with a circular rotation of the blades, the formation of needle-shaped burrs cannot be satisfactory prevented and, moreover, in many cases, the cut is incomplete.

U.S. Pat. No. 5,207,138 discloses a high-speed shear for transverse cutting of a strip material and having upper and lower blade drums which are displaced away form each with a hydraulic setting device and which are accelerated until the rotational speed of the drums corresponds to the advancing speed of the to-be-cut rolled strip. Then, the drums are brought into their cutting position and shear the strip. The drums are driven by a single motor via a divider mechanism. The drive includes a rotational position sensor for generating positional signals in response to which, a control device controls the approachment movement of the drums until the drums are brought into their cutting position. The drive, gear, transmission, control, and setting parts of this shear are rather expensive.

Another high-speed shear for transverse cutting of rolled strips is disclosed in German application DE 198 09 813A. The shear is designed for quality cutting of very thin strips advanced with a speed up to 3 m/sec. One of the drums is supported on a rocker arm, and the adjusting or setting device includes a drive, which provides for a cutting movement of the drum, and support element arranged between the drive and the rocker arm, with the support element being shortened in accordance with the operative position of the cut. The cutting tools are formed as a chisel provided on one of the drums and an anvil provided on another drum.

German Publication DE-OS 26 54 866 discloses a rotary drum shear for extruded rolled stock. The shear includes a drum rotating device with force-transmitting means connected with one of the drums, and a drive for continuously rotating the drums with speeds that provide for synchronization of tangential speed of the shear blades with the running speed of the cut material. The shear further has a drum adjusting or setting device including a further drive for displacing the shear drums between an open, run-through position, and a cutting position. The shear also includes a control unit for the drive of the adjusting or setting device which controls the drive operation.

In the shear disclosed in DE-OS 26 54 866 the ratio of the diameters of the first and second drums in equal 2 to 3, and their rotation is so coordinated that the second drum performs two revolution per three revolution of the first drum. The drum setting or adjusting device is so controlled that the first and second drums are in the cutting position after six revolutions of the first drum and four revolution of the second drum.

In the shear of DE-OS 26 54 866, a very precise positioning of the blades is required in order to obtain a smooth, burr-free cut of the strip which, in turn, requires precise mounting of the drive elements in order to obtain a backlash-free operation. Besides, the drive elements, the control unit, various setting and adjusting devices are rather complicated and are, therefore, very expensive.

Accordingly, an object of the present invention is to provide a high-speed drum shear for transverse cutting of a rolled strip and, in particular a very thin strip, in which the above-listed drawbacks are eliminated.

Another object of the present invention is to provide a high-speed drum shear for transverse cutting of a rolled strip with reduced constructive expenses of elements used in synchronization of the drums, while insuring an exact positioning of the blades during the cutting process.

SUMMARY OF THE INVENTION

This and other objects of the present invention, which will become apparent hereinafter, are achieved by providing in a high-speed shear of the type described above, a device for rotationally synchronizing the two drums in both their open position and their cutting position, with the synchronizing device having respective tooth elements provided on the two drums and engaging each other, and with the tooth elements being so formed that they insure synchronization in the open position of the drums when they engage each other with a large tooth backlash and, in the cutting position of the drum, engage each other substantially backlash-free. Advantageously, the tooth elements are formed with involute teeth.

Providing a device according to the present invention, which insures a permanent synchronization in both the open position of the drums when the drums are spaced from each other, and the cutting position of the drums, permits to eliminate the additional divider mechanism for transmitting the rotational movement to both drums, together with the necessary to that end double universal joint shafts. Eliminating such divider mechanism substantially reduce manufacturing, maintenance and exploitation costs. In addition, a correct tooth backlash in the cutting position or actually its absence, except of a very small backlash necessary for obtaining a precise blade gap, is positively obtained. With an increase of the distance between the drums, the backlash also positively increases. However, under all conditions, independent on the size of the backlash, synchronization is insured to an extent that permits to transmit the necessary idle-run torque.

According to the present invention, one of the drums has a fixed support, and another drum has an adjustable support. Advantageously, the adjustment or setting of the adjustable support is effected by using an eccentric support with a controllable drive. Preferably, both drums have adjustable, mechanically driven, eccentric supports, with the supports being synchronized with a gear mechanism.

Further, in order to insure a balanced drive of both drums, with one drum being a driving drum and another drum being a driven drum and with a smallest possible tooth backlash, the one drum is provided with a rotary drive having an electromotor, and another drum is provided with a brake, advantageously, an electric brake.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 1a a gear teeth diagram of a drum pair of a high-speed shear according to the present invention in an open position;

FIG. 1b a gear teeth diagram of the drum pair shown in FIG. 1a in a cutting position;

FIG. 2a a diagram showing the drum pair shown in FIGS. 1–2 with an open run-through gap;

FIG. 2b a diagram of the drum pair shown in FIGS. 1–3 with the cutting blades in the cutting position;

FIG. 4 a cross-sectional view of a high-speed shear according to the present invention;

FIG. 5 a plan view of a high-speed shear according to the present invention;

FIG. 6 a side view of the shear according to the present invention together with a roller table and pinch roller assembly; and FIG. 7 a cross-sectional view of a gear drive of the shear shown in FIG. 6.

DETAILED DESCRIPTION OF THE PREFERRED EMBODIMENT

Figure 3A:
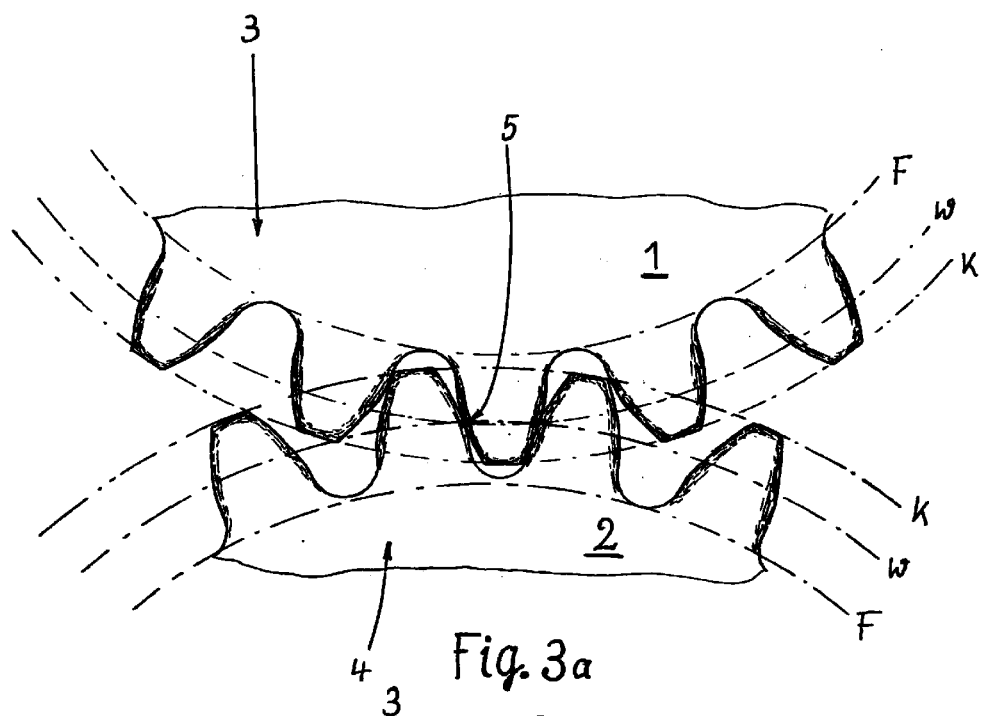
FIG. 3a a diagram of teeth engagement of an involute tooth system of the drum pair in the cutting position.

FIGS. 1a–1b show, as it has been discussed above, a gear teeth diagram of a pair of blade carrying drums 1, 2 of a high-speed shear according to the present invention in open and cutting positions of the drums 1, 2. The drum 2 is supported in a fixed support 10, with the drum 1 being supported by an eccentric bushing 12 (Fig.) with a possibility of movement relative to the fixed support 10. The drums 1, 2 are fixedly connected with respective tooth gears 3, 4 having a dedendum circle F, an addendum circle K, and a pitch circle W. As shown in FIG. 1b, in the cutting position, the dedendum circles F of the gears 3 and 4 approach each other, and the pitch circles W forcelockingly roll relative to each other in a per se known manner.

FIGS. 2a–2b show the same positions as FIGS. 1a–1b but with illustration of the relative position of the cutting blades 7, 7' carried, respectively, by the drums 1, 2. In the open position, which is shown in FIG. 2a, the strip 9 runs through the blade gap without any contact with the blades 7, 7'. In the position shown in FIG. 2b, the strip 9 is cut by the blades 7, 7' in a known manner.

Figure 3B:
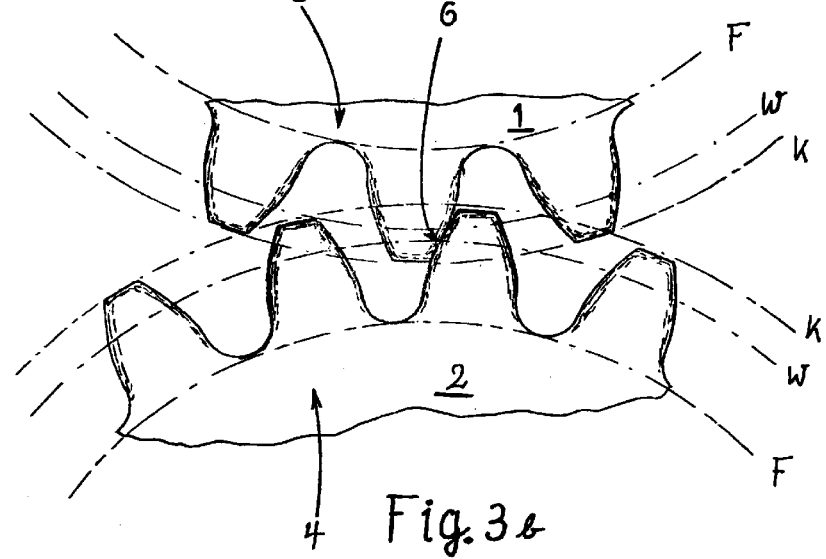
FIG. 3b a diagram of teeth engagement of an involute tooth system of the drum pair in the open position.

FIGS. 3a–3b show, as it has also been discussed above, a teeth engagement diagram of the gears 3 and 4 in the cutting and open positions, respectively. The respective addendum, pitch, and dedendum circles are shown with dash-dot lines. As shown in FIGS. 3a–3b, the gears 3, 4 are so formed that in both cutting and open positions, their teeth engagement is rotationally synchronized. As shown in FIGS. 3a–3b, the gears 3 and 4 engage each other, practically, without any teeth backlash in the cutting position of the associated drums 3, 4, but have a large teeth backlash in the open position. As can clearly be seen in FIG. 3b, in the open position, the respective pitch circles W are further spaced from the respective dedendum circles F than in the cutting positions (FIG. 3a). However, even in the open position (FIG. 3b), synchronization is insured by at least one tooth pair.

As shown in the drawings, the blade gap is relatively large. The gap is sufficient for a rolled strip, which has a thickness, e.g., of 1 through 4 mm, to pass through the open gap without contacting any surface even when the strip head is slightly bent up.

FIG. 4 shows a cross-sectional view of a shear according to the present taken along line A—A in FIG. 6. The shear includes two blade drums 1 and 2 the shafts 18, 20 of which are supported with roller bearings in rotatable eccentric bushings 12, 12' with a possibility of movement relative to each other. The blade drums 1 and 2 are constantly rotationally synchronized by tooth gears 3, 4 which are permanently engaged with each other. The lower gear 4, which is associated with the blade drum 2, is radially divided in two sections torsionally preloaded relative to each other by an appropriate spring element.

In the embodiment shown in FIG. 4, similar eccentric bushings 12, 12' are provided for the shafts 18, 20, respectively. The eccentric bushings 12, 12' are synchronously connected with each other by a common tooth gear drive 13, 13'. Their eccentric positions are adjusted by respective adjusting drives 17, 17'. Synchronization between the adjusted position and a blade position can be effected in per se known way with appropriate control means.

Further, with the embodiment in which the blade drum 1 is fixedly supported, after stopping of both blade drums 1, 2, can be lifted off support with hydraulic means 16, 16' to provide a sufficiently large opening for passing the strip through the gap between the two drums 1, 2.

FIG. 5 shows a plan view of the shear shown in FIG. 4, with the main drive shaft 18 connected with a universal-joint shaft, and with hydraulic means 16, 16'.

FIG. 6 shows a side view of the shear with a strip 9, which is advanced on a roll table at the moment the strip 9 is being cut. FIG. 7 shows a cross-sectional view of the gear drive of the shear.

According to the present invention, in order to present an undesirable contact between the blades 7, 7' and the strip 9 when the gap between the blade drum 1, 2 is open, the strip 9 is advanced strictly horizontally and is transported by pinch or guide rollers 4, 14', which are arranged in front of and behind the blade drum pair 1, 2, under a tensile prestress.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. High-speed shears for transversely cutting a rolled strip having a small thickness, comprising first and second oppositely located drums at least one blade provided on one of the first and second drums; a fixed support for supporting one of the first and second drums and an adjustable support for supporting another of the first and second drums and having eccentric means that provides for adjusting a position of the adjustable support; controllable means for displacing the first and second drums between a cutting position, in which the strip is cut, and an open, run-through position, in which the strip can be freely advanced between the first and second drums; and means for rotationally synchronizing the first and second drums in both the open position thereof and the cutting position thereof, the synchronizing means comprising first and second tooth elements provided, respectively, on the first and second drums and permanently overlapping each other, the first and second tooth elements being so formed that they insure synchronization in both the cutting position of the first and second drums in which the first and second tooth elements engage each other substantially backlash-free, and in the open position of the first and second drums in which the first and second tooth elements engage each other with a large backlash.

2. Shears as set forth in claim 1, wherein the first and second tooth elements are formed as tooth gears having involute teeth.

3. Shears as set forth in claim 1, wherein the two drums have motive eccentric supports, and wherein the shear further comprises tooth gear drive means for synchronizing the eccentric supports of the drums.

4. Shears as set forth in claim 1, wherein one of the drums has an electromotor-actuated rotary drive, and another of the drums is equipped with a brake.

5. Shears as set forth in claim 4, wherein the brake of the another of the two drums is formed as an electric brake.

6. Shears as set forth in claim 1, further comprising one of pinch roller means and guide roller means for transporting the strip under a tensile prestress.

* * * * *